(12) United States Patent
You et al.

(10) Patent No.: US 10,798,746 B2
(45) Date of Patent: Oct. 6, 2020

(54) COMMUNICATION METHOD USED FOR RANDOM ACCESS, TERMINAL, AND BASE STATION

(71) Applicant: HUAWEI TECHNOLOGIES CO., LTD., Shenzhen (CN)

(72) Inventors: Chunhua You, Shenzhen (CN); Qufang Huang, Shenzhen (CN); Yi Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 12 days.

(21) Appl. No.: 16/186,580

(22) Filed: Nov. 11, 2018

(65) Prior Publication Data
US 2019/0132883 A1 May 2, 2019

Related U.S. Application Data

(63) Continuation of application No. PCT/CN2016/081874, filed on May 12, 2016.

(51) Int. Cl.
*H04W 4/00* (2018.01)
*H04W 74/08* (2009.01)
*H04L 1/18* (2006.01)

(52) U.S. Cl.
CPC ....... *H04W 74/0833* (2013.01); *H04L 1/1812* (2013.01); *H04L 1/1896* (2013.01); *H04W 74/0808* (2013.01)

(58) Field of Classification Search
CPC ....... H04L 1/1671; H04L 1/18; H04L 1/1812; H04L 1/1822; H04L 1/1861;
(Continued)

(56) References Cited

U.S. PATENT DOCUMENTS

| | | | |
|---|---|---|---|
| 8,582,511 B2* | 11/2013 | Vujcic | H04W 74/002 370/328 |
| 8,830,969 B2* | 9/2014 | Yang | H04L 5/001 370/336 |

(Continued)

FOREIGN PATENT DOCUMENTS

| | | | |
|---|---|---|---|
| CN | 101426275 A | | 5/2009 |
| CN | 101873707 A | | 10/2010 |

(Continued)

OTHER PUBLICATIONS

Technical Report, 3rd Generation Partnership Project; Technical Specification Group Radio Access Network; Study on Licensed-Assisted Access to Unlicensed Spectrum; 3GPP TR 36.889 V13.0.0, 87 pages, Jun. 2015.*

(Continued)

*Primary Examiner* — Frank Duong
(74) *Attorney, Agent, or Firm* — Kilpatrick Townsend & Stockton LLP

(57) ABSTRACT

Embodiments of the present invention provide a communication method used for random access, including: receiving, by a terminal, random access preamble information sent by a base station; and before sending random access to the base station based on the random access preamble information, receiving, by the terminal, a random access response sent by the base station, where the random access response includes an uplink asynchronous hybrid automatic repeat request HARQ process identifier, and the uplink asynchronous HARQ process identifier is used by the terminal to send uplink data to the base station. Compared with the prior art, the communication method provided in the embodiments of the present invention can ensure to some extent that uplink data is transmitted timely and can effectively improve uplink data transmission reliability.

16 Claims, 7 Drawing Sheets

(58) Field of Classification Search
CPC ...... H04L 1/1896; H04L 27/26; H04W 72/04; H04W 72/14; H04W 74/08; H04W 74/0833; H04W 74/0808
See application file for complete search history.

(56) References Cited

U.S. PATENT DOCUMENTS

| | | | | |
|---|---|---|---|---|
| 9,204,461 | B2* | 12/2015 | Kwon | ................. H04W 74/002 |
| 9,220,095 | B2* | 12/2015 | Tsuboi | ................ H04W 72/042 |
| 10,342,040 | B2* | 7/2019 | Lee | ....................... H04W 74/02 |
| 2017/0150367 | A1 | 5/2017 | Han et al. | |
| 2017/0222749 | A1* | 8/2017 | Dinan | .................... H04L 1/0023 |
| 2018/0138962 | A1* | 5/2018 | Islam | .................... H04L 5/0048 |
| 2018/0278378 | A1* | 9/2018 | Suzuki | ................. H04L 1/1861 |
| 2019/0393976 | A1* | 12/2019 | Dinan | ................. H04W 72/042 |

FOREIGN PATENT DOCUMENTS

| | | |
|---|---|---|
| CN | 102201859 A | 9/2011 |
| CN | 105323049 A | 2/2016 |
| CN | 105491675 A | 4/2016 |
| EP | 3288307 A1 | 2/2018 |
| WO | 2016053836 A1 | 4/2016 |

OTHER PUBLICATIONS

Huawei, HiSilicon,"UL HARQ handling for LAA SCell",3GPP TSG-RAN WG2 Meeting #93bis R2-162430,Dubrovnik, Croatia Apr. 11-15, 2016,total 4 pages.

Fujitsu: "MAC impact for supporting UL transmission on LAA SCell", 3GPP Draft; R2-151455, Apr. 2015, XP050936382, 6 pages.

NTT DOCOMO et al: "Discussion on UL scheduling design for eLAA", 3GPP Draft; R1-160947, Feb. 2016, XP051054255, 6 pages.

NTT DOCOMO et al: "Discussion on UL scheduling design for eLAA", 3GPP Draft; R1-162600, Apr. 2016, XP051079691 , 6 pages.

NVIDIA: "UL HARQ considerations for LTE LAA", 3GPP Draft; R2-151551, Apr. 2015, XP050936466, 6 pages.

* cited by examiner

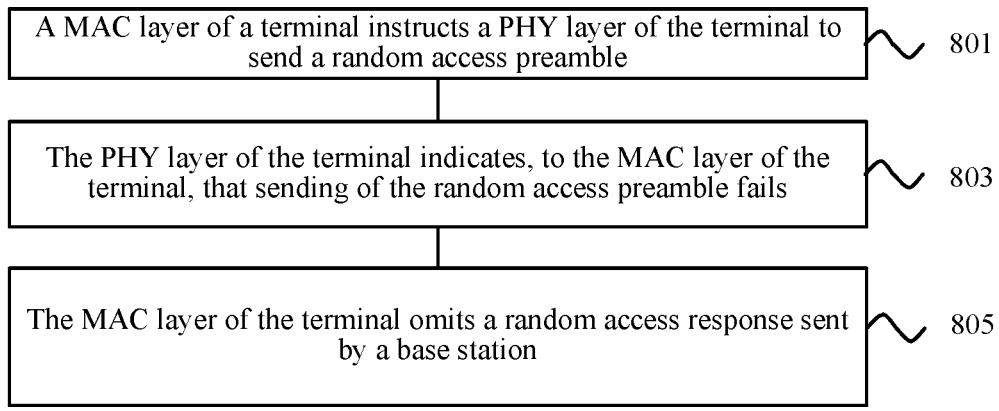

COMMUNICATION METHOD USED FOR RANDOM ACCESS, TERMINAL, AND BASE STATION

CROSS-REFERENCE TO RELATED APPLICATIONS

This application is a continuation of International Application No. PCT/CN2016/081874, filed on May 12, 2016, the disclosure of which is hereby incorporated by reference in its entirety.

TECHNICAL FIELD

Embodiments of the present invention relate to the communications field, and more specifically, to a communication method used for random access, a terminal, and a base station.

BACKGROUND

In a Long Term Evolution (Long Term Evolution, "LTE" for short) system, data is sent by sharing a channel. A same element signal has different attenuations and interferences when transmitted on different frequency resources, and the attenuations and interferences constantly change. Cells using licensed spectrums are referred to as normal (Normal) cells (which may also be referred to as licensed cells). Because frequencies used by the cells are officially licensed, interferences are controllable and data transmission is relatively reliable.

Currently, the third Generation Partnership Project (third Generation Partnership Project, "3GPP" for short) introduces a license assisted access (License Assisted Access, "LAA" for short) cell. Carrier aggregation (Carrier Aggregation, "CA" for short) is performed on a license assisted access cell and a normal cell. The LAA cell is usually used as a secondary cell (Scell). A difference from a normal cell is that an LAA cell uses unlicensed bands, and any person can perform communication by using the bands. Therefore, the LAA cell is interfered with, and data transmission reliability of the LAA cell is relatively low.

In addition, the 3GPP stipulates that in data transmission in an LAA cell, both a base station (Evolved Node B, "eNB" for short) and user equipment (User Equipment, "UE" for short) first need to complete a listen before talk (Listen Before Talk, "LBT" for short) process before sending any data. If LBT succeeds, data is normally sent; otherwise, data cannot be sent.

In the prior art, in uplink transmission of a random access process, UE may generate, for example, a Media Access Control (Medium Access Control, "MAC" for short) protocol data unit (Protocol Data Unit, "PDU" for short), and then instruct a physical layer to report the MAC PDU to an eNB. However, when the UE sends the MAC PDU by using an unlicensed-spectrum cell, the physical layer needs to first perform a listen before talk (Listen Before Talk, "LBT" for short) process before transmitting data. If the LBT process fails, uplink data cannot be transmitted to the eNB. Therefore, when the UE performs uplink transmission by using an unlicensed-spectrum cell, an operation based on an existing procedure affects reliability and timeliness of reporting uplink data.

SUMMARY

Embodiments of the present invention provide a communication method used for random access, a terminal, and an apparatus, to effectively improve uplink data transmission reliability.

According to a first aspect, a communication method used for random access is provided. The method includes:

receiving, by a terminal, random access preamble information sent by a base station;

sending, by the terminal, a random access preamble to the base station based on the random access preamble information; and receiving, by the terminal, a random access response sent by the base station, where the random access response includes an uplink asynchronous hybrid automatic repeat request HARQ process identifier, and the uplink asynchronous HARQ process identifier is used by the terminal to send uplink data to the base station.

With reference to the first aspect, in a possible implementation of the first aspect, the random access response further includes listen before talk LBT information, and the LBT information is used by the terminal to obtain an unlicensed-spectrum channel; and the method further includes:

performing, by the terminal, uplink transmission in a licensed assisted access LAA cell of the base station based on the unlicensed-spectrum channel.

With reference to the first aspect and the foregoing possible implementation, in a possible implementation of the first aspect, the method further includes:

when carrier aggregation is performed on the LAA cell of the base station and a licensed cell, the method is used by the terminal to perform non-contention-based random access based on the LAA cell, and the method specifically includes:

receiving, by the terminal, the random access preamble sequence sent by the base station in any serving cell of the terminal;

sending, in the LAA cell of the base station by the terminal, the random access preamble to the base station; and receiving, by the terminal, the random access response sent by the base station in a primary cell of the base station.

With reference to the first aspect and the foregoing possible implementations, in a possible implementation of the first aspect, the random access response further includes a physical cell identifier PCI, where the physical cell identifier PCI is used by the terminal to identify whether the random access response is applicable to the terminal.

With reference to the first aspect and the foregoing possible implementations, in a possible implementation of the first aspect, the random access response further indicates that an uplink resource used by the terminal to perform uplink transmission is located on the unlicensed-spectrum channel of the LAA cell.

With reference to the first aspect and the foregoing possible implementations, in a possible implementation of the first aspect, the random access response further includes at least one of the following:

a quantity of scheduled subframes, used to schedule a plurality of subframes at a time to perform the uplink transmission;

a time interval of the LBT;

a subframe offset, used to indicate a subframe interval between uplink grant and the uplink transmission, where the random access response further includes the uplink grant; and a start symbol and an end symbol of the uplink transmission.

With reference to the first aspect and the foregoing possible implementation, in a possible implementation of the first aspect, the random access response further includes the uplink grant, and at least one of the uplink asynchronous HARQ process identifier and the LBT information is located in a field reserved for the uplink grant in the random access response.

According to a second aspect, a communication method used for random access is provided. The method includes:

sending, by a base station, random access preamble information to a terminal;

receiving, by the base station, a random access preamble sent by the terminal; and sending, by the base station, a random access response to the terminal, where the random access response includes an uplink asynchronous hybrid automatic repeat request HARQ process identifier, and the uplink asynchronous HARQ process identifier is used by the terminal to send uplink data to the base station.

With reference to the second aspect, in a possible implementation of the second aspect, the random access response further includes listen before talk LBT information, and the LBT information is used by the terminal to obtain an unlicensed-spectrum channel; and the method further includes:

performing, in a licensed assisted access LAA cell of the base station, uplink transmission with the terminal based on the unlicensed-spectrum channel.

With reference to the second aspect and the foregoing possible implementation, in a possible implementation of the second aspect, when carrier aggregation is performed on the LAA cell of the base station and a licensed cell, the method is used by the terminal to perform non-contention-based random access based on the LAA cell, and the method specifically includes:

sending, by the base station, the random access preamble sequence to the terminal in any serving cell of the terminal;

receiving, by the base station, in the LAA cell of the base station, the random access preamble sent by the terminal; and sending, by the base station, in a primary cell of the base station, the random access response to the terminal.

With reference to the second aspect and the foregoing possible implementations, in a possible implementation of the second aspect, the random access response further includes a physical cell identifier PCI, used to identify whether the random access response is applicable to the terminal.

With reference to the second aspect and the foregoing possible implementations, in a possible implementation of the second aspect, the random access response further indicates that an uplink resource used by the terminal to perform uplink transmission is located on the unlicensed-spectrum channel of the LAA cell.

With reference to the second aspect and the foregoing possible implementation, in a possible implementation of the second aspect, the random access response further includes at least one of the following:

a quantity of scheduled subframes, used to schedule a plurality of subframes at a time to perform the uplink transmission;

a time interval of the LBT;

a subframe offset, used to indicate a subframe interval between uplink grant and the uplink transmission, where the random access response further includes the uplink grant; and a start symbol and an end symbol of the uplink transmission.

With reference to the second aspect and the foregoing possible implementation, in a possible implementation of the second aspect, the random access response further includes the uplink grant, and at least one of the uplink asynchronous HARQ process identifier and the LBT information is located in a field reserved for the uplink grant in the random access response.

According to a third aspect, a terminal is provided. The terminal includes:

a receiver, configured to receive random access preamble information sent by a base station; and a transmitter, configured to send a random access preamble to the base station based on the random access preamble information, where the receiver is further configured to receive a random access response sent by the base station, the random access response includes an uplink asynchronous hybrid automatic repeat request HARQ process identifier, and the uplink asynchronous HARQ process identifier is used by the terminal to send uplink data to the base station.

With reference to the third aspect, in a possible implementation of the third aspect, the random access response further includes listen before talk LBT information, and the LBT information is used by the terminal to obtain an unlicensed-spectrum channel; and the terminal further includes:

a processor, performing, by the terminal, uplink transmission in a licensed assisted access LAA cell of the base station based on the unlicensed-spectrum channel.

With reference to the third aspect and the foregoing possible implementation, in a possible implementation of the third aspect, when carrier aggregation is performed on the LAA cell of the base station and a licensed cell, the terminal performs non-contention-based random access based on the LAA cell, specifically including:

the receiver is configured to receive the random access preamble sequence sent by the base station in any serving cell of the terminal;

the transmitter is configured to send, in the LAA cell of the base station, the random access preamble to the base station; and the receiver is further configured to receive the random access response sent by the base station in a primary cell of the base station.

With reference to the third aspect and the foregoing possible implementations, in a possible implementation of the third aspect, the random access response further includes a physical cell identifier PCI, where the physical cell identifier PCI is used by the processor to identify whether the random access response is applicable to the terminal.

With reference to the third aspect and the foregoing possible implementations, in a possible implementation of the third aspect, the random access response further indicates that an uplink resource used by the terminal to perform uplink transmission is located on the unlicensed-spectrum channel of the LAA cell.

With reference to the third aspect and the foregoing possible implementation, in a possible implementation of the third aspect, the random access response further includes at least one of the following:

a quantity of scheduled subframes, used to schedule a plurality of subframes at a time to perform the uplink transmission;

a time interval of the LBT;

a subframe offset, used to indicate a subframe interval between uplink grant and the uplink transmission, where the random access response further includes the uplink grant; and a start symbol and an end symbol of the uplink transmission.

With reference to the third aspect and the foregoing possible implementation, in a possible implementation of the third aspect, the random access response further includes the uplink grant, and at least one of the uplink asynchronous HARQ process identifier and the LBT information is located in a field reserved for the uplink grant in the random access response.

According to a fourth aspect, a base station is provided. The base station includes:

a transmitter, configured to send random access preamble information to a terminal; and a receiver, configured to receive a random access preamble sent by the terminal, where the transmitter is further configured to send a random access response to the terminal, the random access response includes an uplink asynchronous hybrid automatic repeat request HARQ process identifier, and the uplink asynchronous HARQ process identifier is used by the terminal to send uplink data to the base station.

With reference to the fourth aspect, in a possible implementation of the fourth aspect, the random access response further includes listen before talk LBT information, and the LBT information is used by the terminal to obtain an unlicensed-spectrum channel; and the base station further includes:

a processor, configured to perform, in a licensed assisted access LAA cell of the base station, uplink transmission with the terminal based on the unlicensed-spectrum channel.

With reference to the fourth aspect and the foregoing possible implementation, in a possible implementation of the fourth aspect, when carrier aggregation is performed on the LAA cell of the base station and a licensed cell, the terminal performs non-contention-based random access based on the LAA cell, specifically including:

the transmitter is configured to send the random access preamble sequence to the terminal in any serving cell of the terminal;

the receiver is configured to receive, in the LAA cell of the base station, the random access preamble sent by the terminal; and the transmitter is further configured to send, in a primary cell of the base station, the random access response to the terminal.

With reference to the fourth aspect and the foregoing possible implementations, in a possible implementation of the fourth aspect, the random access response further includes a physical cell identifier PCI, used to identify whether the random access response is applicable to the terminal.

With reference to the fourth aspect and the foregoing possible implementations, in a possible implementation of the fourth aspect, the random access response further indicates that an uplink resource used by the terminal to perform uplink transmission is located on the unlicensed-spectrum channel of the LAA cell.

With reference to the fourth aspect and the foregoing possible implementation, in a possible implementation of the fourth aspect, the random access response further includes at least one of the following:

a quantity of scheduled subframes, used to schedule a plurality of subframes at a time to perform the uplink transmission;

a time interval of the LBT;

a subframe offset, used to indicate a subframe interval between uplink grant and the uplink transmission, where the random access response further includes the uplink grant; and a start symbol and an end symbol of the uplink transmission.

With reference to the fourth aspect and the foregoing possible implementation, in a possible implementation of the fourth aspect, the random access response further includes the uplink grant, and at least one of the uplink asynchronous HARQ process identifier and the LBT information is located in a field reserved for the uplink grant in the random access response.

Based on the foregoing technical solutions, in a communication method used for random access provided in the embodiments of the present invention, after receiving the random access response sent by the base station, the terminal can effectively obtain, based on the random access response, uplink resource used to send uplink data, and can send the uplink data to the base station based on successful LBT contention, to ensure normal communication with the base station. Therefore, compared with the prior art, the method provided in the embodiments of the present invention can ensure to some extent that uplink data is transmitted timely and can further effectively improve uplink data transmission reliability.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 7 is a schematic composition diagram of a configuration of a random access response according to an embodiment of the present invention;

FIG. 8 is another schematic flowchart of a communication method used for non-contention-based random access according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should also be understood that in the embodiments of the present invention, user equipment (User Equipment, "UE" for short) may be referred to as a terminal, a mobile station (Mobile Station, "MS" for short), a mobile terminal (Mobile Terminal), or the like. The user equipment may communicate with one or more core networks by using a radio access network (Radio Access Network, "RAN" for short). For example, the user equipment may be a mobile phone (or referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

Figure 1:
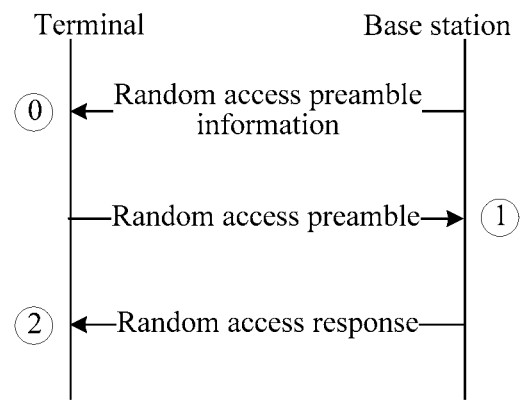
FIG. 1 is a schematic flowchart of an application scenario according to an embodiment of the present invention.

For ease of understanding and describing an uplink data transmission method and user equipment provided in the embodiments of the present invention, the following first describes an application scenario of the embodiments of the present invention with reference to FIG. 1.

In the embodiments of the present invention, a base station may be a base transceiver station (Base Transceiver Station, "BTS" for short) in GSM, or may be a NodeB (NodeB, "NB" for short) in WCDMA, or may be an evolved Node B (Evolved Node B, "eNB or e-NodeB" for short) in LTE. This is not limited in the embodiments of the present invention. However, for ease of description, the following embodiments use an eNB as an example for description.

In LTE, random access is introduced so that UE can access a network or communicate with a network. Random access has two cases in total: contention-based random access and non-contention-based random access. In the embodiments of the present invention, a random access type is mainly non-contention-based random access.

As shown in FIG. 1, for a process of non-contention-based random access 100, mainly refer to the following description:

101: A base station sends random access preamble information (random access preamble assignment) to a terminal.

The random access preamble information may include a preamble index (English: preamble index) and a preamble root sequence index (rootSequenceIndex). The preamble root sequence index and the preamble index may be sent in different messages, and are used by UE to generate a random access preamble, for example, a random access preamble sequence. In addition, the base station may send the random access preamble information to the terminal in a handover process or in a Radio Resource Control (radio resource control, RRC for short) connected mode. For example, the base station may send a handover command carrying the random access preamble information to the terminal. For another example, the base station may send the preamble root sequence index to the terminal by using an RRC message. When downlink data arrives and uplink timing is asynchronous, the base station sends the preamble index of the random access preamble information to the terminal by using a physical downlink control channel (physical downlink control channel, PDCCH for short), to trigger the terminal to perform random access.

102: The terminal sends a random access preamble (random access preamble, RA preamble for short) to the base station.

The terminal may select a proper time frequency resource of the random access preamble based on a time frequency resource that is of the random access preamble and that is preconfigured by the base station, to send the random access preamble, and obtain a random access radio network temporary identifier (random access radio network temporary identifier, RA-RNTI for short) based on a location of the selected time frequency domain resource of the random access preamble.

For example, the RA-RNTI is deduced by using the following formula:

$$\text{RA-RNTI}=1+t\_id+10*f\_id, \text{ where}$$

t_id is a time domain location of a physical random access channel (physical random access channel, PRACH for short) resource, and f_id is a frequency domain location of the PRACH resource.

103: The base station sends a random access response (random access response) to the terminal.

The random access response is generated by the base station based on the random access preamble sent by the terminal. For example, the terminal detects, by using the RA-RNTI, the random access response sent by the base station. For example, a sub-header (English: sub-header) of the random access response includes a random access preamble index sent by the terminal to the base station, and the terminal can learn that the random access response is sent by the base station to the terminal instead of another terminal.

In addition, after carrier aggregation is introduced, the terminal may simultaneously communicate with a plurality of serving cells, where the serving cells may be provided by one base station. Specifically, the serving cells may include only one primary cell (PCell) used by the terminal to send control signaling. For example, a physical uplink control channel (physical uplink control channel, PUCCH for short) may be configured in the primary cell to send control signaling, or the terminal may receive a broadcast message or receive a paging message in the primary cell. Another serving cell may be a secondary cell SCell. For example, the secondary cell may include no PUCCH, and the terminal cannot send uplink control signaling in the secondary cell, or cannot receive a broadcast message or receive a paging message in the secondary cell. In addition, in consideration of reducing PDCCH blind detections of another secondary cell, the random access response message may be sent by using a PCell.

Figure 2:
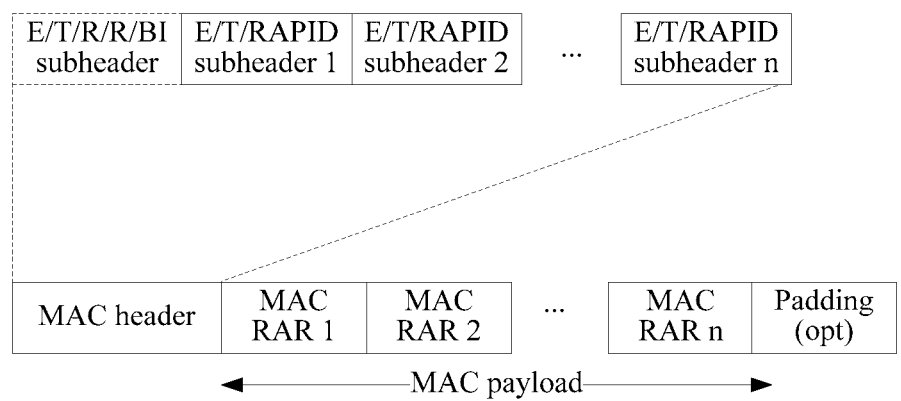
FIG. 2 is a schematic diagram of constructing a MAC PDU according to an embodiment of the present invention.

As shown in FIG. 2, sending a Media Access Control (medium access control, MAC for short in English) packet data unit (protocol data unit, PDU for short in English) of the random access response is used as an example. A MAC PDU may include a MAC header (header) and a MAC payload (payload). The MAC payload includes zero or at least one MAC CE (Control element, the control unit) (not shown in the figure), and zero or at least one MAC random access response (Random Access Response, RAR). For example, the random access response may be referred to as a MAC RAR, and a size of the MAC RAR is determinate and is, for example, 48 bits. It may be understood that the MAC PDU may further include a padding (English: padding).

The MAC header includes a plurality of sub-headers (sub-header), and each sub-header may include a field T/R/E/RAPID/BI. R indicates a reserved field, E indicates whether a current sub-header is the last sub-header in the MAC PDU, T indicates that the sub-header includes a random access preamble sequence index (random access preamble index or random access preamble identifier, RAPID for short) or a backoff indicator (backoff indicator, BI for short).

MAC sub-headers sequentially correspond to units (MAC CE, MAC RAR) in a MAC payload. To be specific, a first sub-header corresponds to a first unit, a second sub-header corresponds to a second unit, and so on. It may be understood that the terminal determines a location of each sub-header and a start location of a MAC payload, and the terminal performs matching with a sub-header based on a preamble index, and determines a location of a MAC RAR in a MAC payload based on a location of a matched sub-header relative to a second MAC sub-header. A BI or a RAPID in a sub-header may represent a type of a unit corresponding to the sub-header. For example, when a sub-header carries a RAPID, it indicates a first MAC sub-header format; and when a sub-header carries a BI, it indicates a second MAC sub-header format.

Figure 3:
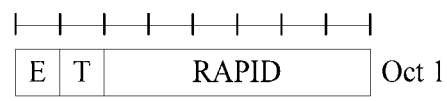
FIG. 3 is a schematic diagram of a MAC header format according to an embodiment of the present invention.

As shown in FIG. 3, the first MAC sub-header format has, for example, a total of eight bits (bit), and a RAPID may occupy six bits. E indicates whether there is a MAC sub-header behind in the MAC PDU. When E=1, it may indicate that there is still a MAC sub-header, and when E=0, it may indicate that there is a random access response behind. T indicates whether there is a RAPID or a BI behind. When T=1, it may indicate the first MAC sub-header format, and when T=0, it may indicate the second MAC sub-header format.

Figure 4:
FIG. 4 is a schematic diagram of another MAC header format according to an embodiment of the present invention.

FIG. 4 shows the second MAC sub-header format. For example, there are a total of eight bits. E indicates whether there is a MAC sub-header behind in the MAC PDU. When E=1, it may indicate that there is still a MAC sub-header, and when E=0, it may indicate that there is a random access response behind. T indicates whether there is a RAPID or a BI behind. When T=1, it may indicate the first MAC sub-header format, and when T=0, it may indicate the second MAC sub-header format. R is a reserved bit field and is set to 0. When contention fails, that is, no random access response is received, the BI is used to randomly select a time value within a backoff indicator indicated by the BI, and the time value is used as a backoff time. After the backoff time, the terminal may continue to send a random access preamble to the base station.

When the UE needs to send data, uplink synchronization and grant by an eNB are first required. To be specific, the UE applies for data sending grant from the eNB. It should be understood that the UE applies for data sending grant from the eNB mainly in two manners: In one manner, the eNB configures a scheduling request (Scheduling Request, "SR" for short) resource for the UE, and the UE applies for data sending grant from the eNB by using the SR resource. In the other manner, the eNB configures no SR resource for the UE, and the UE first performs a random access process and then performs a data sending process. Random access is mainly intended to obtain uplink grant or obtain uplink synchronization of the eNB. The present invention is mainly implemented in the latter manner, and specifically, non-contention-based random access is performed to obtain uplink synchronization. The following provides detailed descriptions.

After receiving the random access preamble of the UE, the eNB performs resource scheduling decision to determine whether to provide a service for the UE, for example, notifies an uplink time advance to facilitate uplink synchronization; and/or allocates an uplink resource to facilitate uplink transmission. A minimum unit of resource scheduling by the eNB is a physical resource block. The physical resource block is formed by both a time domain resource and a frequency domain resource, and the physical resource block is a time resource of 1 ms in time domain, and is a frequency resource of 12 subcarriers in frequency domain. The eNB completes data scheduling on the physical resource block. If the eNB determines to provide a service for the UE, the eNB allocates an uplink transmission resource to the UE, and then delivers uplink grant (Uplink Grant, "UL grant" for short) to the UE by using a physical downlink control channel (Physical Downlink Control Channel, "PDCCH" for short). The UL grant may include information such as a modulation and coding scheme (Modulation and coding Scheme, "MCS" for short) and a physical resource block (physical resource block, "PRB" for short). The UL grant, for example, is used to notify the UE of a time and a carrier that may be used for data transmission, and a used modulation and coding scheme, to help the UE transmit uplink data.

Currently, the third Generation Partnership Project (third Generation Partnership Project, "3GPP" for short) introduces a license assisted access (License Assisted Access, "LAA" for short) cell, and carrier aggregation (Carrier Aggregation, "CA" for short) is performed on an LAA cell and a licensed spectrum cell, It should be understood that in carrier aggregation of the LAA cell and the licensed spectrum cell, the licensed spectrum cell may be used as a primary cell PCell and the LAA cell may be used as a secondary cell (Secondary Cell, "SCell" for short). It should be understood that carrier aggregation is a technology in LTE/LTE-A, and UE can simultaneously perform data transmission with a plurality of serving cells. A connection between any two cells may be considered as being ideal, and to be specific, a transmission delay may be omitted. The serving cells may all belong to a same base station. In this embodiment of the present invention, the plurality of serving cells include a licensed spectrum cell and an LAA cell.

In a scenario of performing carrier aggregation on an LAA cell and a licensed spectrum cell, the UE has a plurality of serving cells including an LAA cell. It should be understood that before sending uplink data by using an LAA cell, the UE needs to first perform a listen before talk (Listen before talk, "LBT" for short) process. LBT means that the UE needs to perform channel energy detection before sending uplink data. If detecting that channel energy is lower than a threshold, it is considered that a channel is idle and the channel may be occupied to send the uplink data (which may also be referred to as LBT success). Otherwise, it is considered that the channel is busy and the uplink data cannot be sent (which may also be referred to as an LBT failure).

As can be learned from FIG. 1, in the current technology, the UE performs non-contention-based random access based on a normal cell. After the terminal receives the random access response sent by the base station, it can be ensured that uplink transmission can be successfully performed with the base station. However, in a scenario of performing carrier aggregation on an LAA cell and a normal cell, if the UE or the base station chooses to perform non-contention-based random access to the LAA cell, after a physical layer receives a MAC PDU carrying the random access response belonging to the terminal, an LBT process is first performed. Uplink data can be sent only when LBT succeeds.

It should be understood that two steps are required to send uplink data: a first step is to obtain uplink grant allocated by the base station, and the second step is LBT success. Therefore, in a scenario in which a serving cell of the UE is an LAA cell and carrier aggregation is performed on the LAA cell and a normal cell, when the UE performs non-contention-based random access based on the LAA cell, the existing method of performing uplink transmission with the base station by the terminal reduces uplink reporting reliability and timeliness, affecting uplink communication between the terminal and the base station.

To resolve the foregoing technical problem, an embodiment of the present invention provides an uplink data transmission method and user equipment, to effectively implement effective uplink reporting in non-contention-based random access based on an LAA cell.

Figure 5:
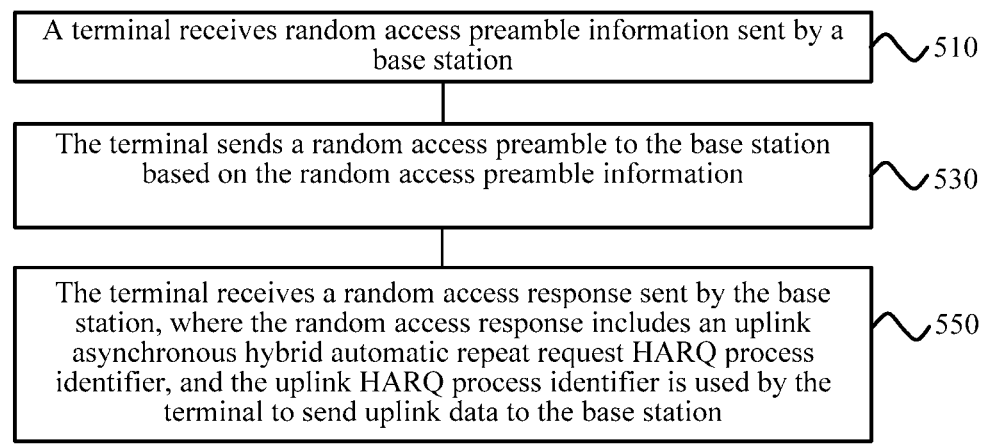
FIG. 5 is a schematic flowchart of a communication method used for non-contention-based random access according to an embodiment of the present invention.

FIG. 5 shows a communication method 500 used for non-contention-based random access according to an embodiment of the present invention. The method 500 includes:

510: A terminal receives random access preamble information sent by a base station.

530: The terminal sends a random access preamble to the base station based on the random access preamble information.

550: The terminal receives a random access response sent by the base station, where the random access response includes an uplink asynchronous hybrid automatic repeat request HARQ process identifier, and the uplink asynchronous HARQ process identifier is used by the terminal to send uplink data to the base station.

It should be understood that when carrier aggregation is performed on the LAA cell of the base station and a licensed cell, the method is used by the terminal to perform non-contention-based random access based on the LAA cell, and the method specifically includes:

receiving, by the terminal, the random access preamble information sent by the base station in any serving cell of the terminal;

sending, by the terminal, the random access preamble to the base station in the LAA cell of the base station; and receiving, by the terminal, the random access response sent in a primary cell of the terminal by the base station.

In this embodiment of the present invention, the uplink asynchronous HARQ process identifier is used for new transmission of uplink data in an asynchronous HARQ mode, and a redundancy version (redundancy version, RV for short in English) corresponding to the newly transmitted data is 0. For example, the base station sends the random access response including uplink grant to the terminal in a subframe m, and the terminal performs initial uplink transmission with the base station in a subframe m+4.

A difference between a synchronous HARQ and an asynchronous HARQ is described in detail as follows:

For the synchronous HARQ, for example, the terminal may select any idle process to perform initial data transmission, and a HARQ process number is configured to 2. The terminal may send uplink data to the base station in a subframe 0, or the terminal subsequently performs new transmission of uplink data in a subframe 8. Therefore, a subframe spacing of a synchronous HARQ time sequence is 8.

For the asynchronous HARQ, for example, the base station instructs the terminal to use a HARQ process 2 in a subframe 0 and use a HARQ process 1 in a subframe 8. Initial transmission is used as an example. The base station instructs, by using downlink control information (downlink control indicator, DCI for short), the terminal to perform uplink transmission in a specific subframe by using a specific HARQ process. During implementation of the present invention, the DCI may be content in the random access response sent by the base station to the terminal.

Application of HARQ synchronization based on an LBT mechanism of an LAA cell increases unreliability of new uplink transmission. This is because the terminal may not be capable of obtaining by contention an unlicensed-spectrum channel corresponding to the LAA cell, and the synchronous HARQ needs to ensure that new uplink transmission is performed in a specified subframe and initial uplink transmission is performed in subframes having a same spacing. When initial transmission cannot be performed in the subframe because of an LBT failure, a transmission delay is increased.

On the contrary, an asynchronous HARQ mechanism can reduce a transmission delay because the base station may flexibly instruct, by using DCI, the terminal to perform initial uplink transmission in a particular subframe, and reduce a transmission delay compared with a synchronous HARQ mechanism.

It should be understood that the random access response may further include listen before talk LBT information, and the LBT information is used by the terminal to obtain an unlicensed-spectrum channel.

Specifically, in carrier aggregation cells, subframes may be aligned, that is, have uniform subframe boundaries and subframe numbers in all cells. Because an LAA cell uses an unlicensed spectrum, a spectrum range of the LAA cell may be specifically channels having corresponding bandwidths in spectrums from 2.4 to 2.5 gigahertz (English: GHz), or from 5 to 6 GHz, or from 60 to 70 GHz, or the like. Before the base station or the terminal sends data, the base station or the terminal needs to first perform LBT and monitor whether an unlicensed-spectrum channel is occupied. If the unlicensed-spectrum channel has been occupied, the base station or the terminal continues monitoring and does not perform sending until it is discovered that the channel is idle. Once discovering that the channel is idle, the base station may start to transmit data. The UE needs to satisfy two conditions before transmitting data. The first condition is obtaining an uplink resource allocated by the base station, and the second condition is that the UE successfully performs LBT.

In this embodiment of the present invention, the random access response may further indicate that an uplink resource used by the terminal to perform uplink transmission is located on the unlicensed-spectrum channel of the LAA cell. For example, the base station allocates an uplink resource to the UE in a subframe m, where a resource allocation indication may be sent by using a normal cell (that is, a licensed cell), or may be sent by using the LAA cell. Regardless of a cell used by the base station to send the resource allocation indication to the terminal, that the uplink resource allocated to the UE is located in the LAA cell is indicated to the UE.

After obtaining the resource allocation indication, the UE may perform LBT before a subframe (m+4), and monitor whether a channel is occupied. If the channel is occupied, that is, LBT fails, uplink data is not sent in the subframe (m+4). If the channel is not occupied, LBT succeeds, and uplink data is sent in the subframe (m+4) by using the LAA cell. The terminal may perform uplink transmission based on a parameter specified by the base station, where the parameter may include at least one of the following: a data packet size (transport block, TB size for short), a modulation and demodulation scheme (modulation and coding scheme, MCS for short), and a power spectrum density. The base station may receive the uplink data in a preset time frequency resource location based on a format autonomously specified by the base station.

Currently, an LBT process mainly has the following manners:

1) Category 2 LBT (category 2 LBT): Clear channel assessment (Clear Channel Assessment, CCA for short in English) detection has no backoff, and a CCA detection is performed at a determined moment. To be specific, when detected channel energy is less than a particular threshold, data is sent. When detected channel energy is higher than a threshold, it is detected that a channel is busy and backoff is not performed and no data is sent. The CCA detection may alternatively continue to be performed at a determined moment, until it is found, in the CCA detection, that the channel is idle. A CCA detection time period may be greater than or equal to 9 microseconds (us).

2) Category 3 LBT (category 3 LBT): A CCA detection having a backoff is performed in a fixed window, to be specific, a backoff indicator is selected in a fixed backoff time window. Data can be sent only after a detection time used to perform a quantity of idle CCA detections, where the quantity is at least the backoff indicator.

3) Category 4 LBT (category 4 LBT): A CCA detection having a backoff is performed in a variable window, to be specific, a backoff indicator is selected in a backoff time window. Data can be sent only after a detection time used to perform a quantity of idle CCA detections, where the quantity is at least the backoff indicator. However, the backoff time window is variable. It may be understood that the method may further include: performing, by the terminal, uplink transmission in a licensed assisted access LAA cell of the base station based on the unlicensed-spectrum channel.

In this embodiment of the present invention, the random access response may further include at least one of the following:

a quantity of scheduled subframes, used to schedule a plurality of subframes at a time to perform the uplink transmission;

a time interval of the LBT, used to indicate a time domain location in which the terminal performs LBT;

a subframe offset, used to indicate a subframe spacing between uplink grant and uplink transmission; and a start symbol and an end symbol of the uplink transmission.

In this embodiment of the present invention, the random access response may further include the uplink grant, and at least one of the uplink asynchronous HARQ process identifier and the LBT information is located in a field reserved for the uplink grant in the random access response.

In this embodiment of the present invention, the random access response may further include a physical cell identifier (physical layer cell identity, PCI for short in English) used by the terminal to identify whether the random access response is applicable to the terminal. In an example, the PCI includes a primary synchronization signal (Primary Synchronization Signal, PSS for short in English) and a secondary synchronization signal (secondary synchronization signal, SSS for short in English), and may be obtained by using a simple operation. For example: PCI=PSS+3*SSS.

Specifically, as throughput requirements become increasingly high, more cells are densely deployed. To be specific, under a condition of a limited preamble sequence index, a plurality of terminals need to be supported to perform non-contention-based random access in a plurality of cells.

In a carrier aggregation scenario, both a random access response for non-contention-based random access to an LAA cell and a random access response for non-contention-based random access to a normal cell that are sent by the base station to the terminal may exist. Content or sizes of the two random access responses may be the same or different. If the random access responses both use a same random access preamble index, the UE needs to distinguish a random access response belonging to the UE in a MAC PDU. For example, a MAC PDU can include only one type of random access response. To be specific, only one of the random access response for non-contention-based random access to an LAA cell and the random access response for non-contention-based random access to a normal cell exists. The UE may distinguish in the following manner:

Solution 1: in obtaining of an RA-RNTI, UE performing non-contention-based random access to an LAA cell is different from UE performing non-contention-based random access to a normal cell, to ensure that an RA-RNTI of the LAA cell does not overlap an RA-RNTI of the normal cell. For example, an RA-RNTI of the LAA cell may be obtained by using the following formula:

$$\text{LAA RA-RNTI} = 1 + t\_id + 10 * f\_id + k, \text{ where}$$

t_id is a time domain resource location of a physical random access channel (physical random access channel, PRACH for short) resource, f_id is a frequency domain location of the PRACH resource, and k is 60 or a positive integer greater than 60.

Solution 2: UE in an LAA cell and UE in a normal cell use different preamble sequences. For example, a preamble can be used by only one type of UE, that is, the UE in the LAA cell or the UE in the normal cell.

Solution 3: A random access response for an LAA cell can be sent only by using a particular cell and not by using a PCell. The particular cell may be used to transmit the random access response for the LAA cell, but cannot be used to transmit a random access response for a normal cell. Specifically, the particular cell used to send the random access response for the LAA cell may be configured by the base station.

The foregoing solutions may be used to distinguish whether the MAC PDU includes the random access response for the LAA cell or the random access response for the normal cell. That is, the solution may be used to distinguish a cell-level random access response.

Further, when random access preamble indexes in a cell are the same, for UEs in different LAA cells, UE-level distinguishing may be performed by using a PCI carried in the random access response.

Figure 6:
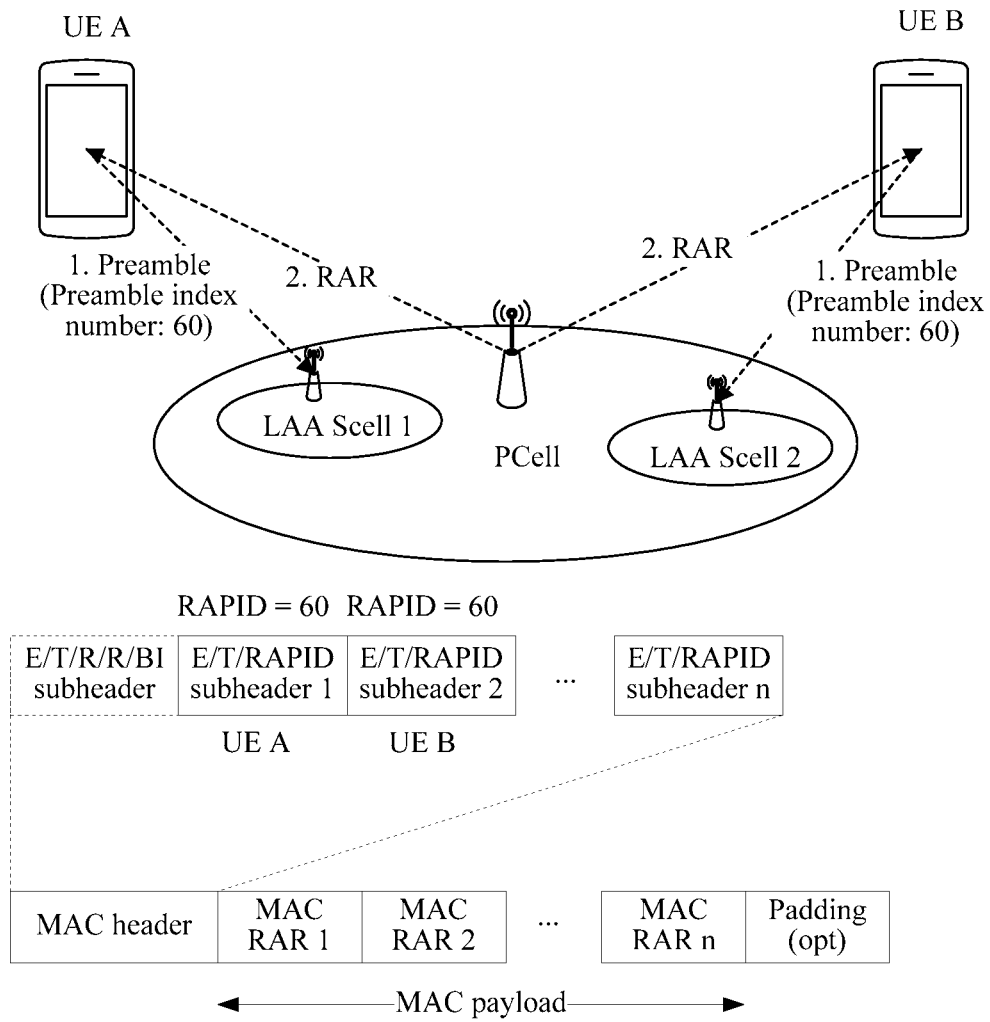
FIG. 6 is a schematic diagram of another application scenario according to an embodiment of the present invention.

Specifically, as shown in FIG. 6, UE A and UE B both belong to a same PCell but different SCells. An SCell of UE is an LAA SCell1 and an SCell of the UE B is an LAA SCell2. The base station allocates a same random access preamble index (Preamble index or Preamble IDentitfier, RAPID for short in English) to the UEs, for example, a preamble sequence 60. Because the two SCells work in different bands or preamble root sequences are different, despite the same preamble sequence 60, random access preambles finally sent are still different. Therefore, there is no interference therebetween, and the base station can simultaneously decode the random access preambles. Therefore, a MAC PDU includes both a random access response message of the UE A and a random access response message of the UE B. In this way, the UE A or the UE B can identify, by using a PCI in the random access response, the random access response message belonging to itself.

In conclusion, FIG. 7 shows a specific configuration of a random access response, and at least one of the following may be included:

timing offset (timing advance command);

uplink grant (uplink grant, UL grant for short);

LBT information that may include a used LBT type or a parameter configuration for the used LBT type. For example, in the category 4 LBT, the terminal is notified of how to select a backoff time or a backoff window size, and the like;

PCI; and uplink asynchronous HARQ process identifier.

It may be understood that the HARQ process identifier may be in any field of the random access response, for example, may be in a reserved field of the timing offset and/or the uplink grant. Alternatively, a reserved field such as an LAA cell field is added to the random access response, and at least one of the HARQ process identifier, the LBT information, and the PCI is included in the reserved field.

Therefore, this embodiment of the present invention avoids a reporting delay caused because the terminal fails in contending for a channel because of an LBT failure in a non-contention-based random access scenario of the LAA cell, and can effectively improve timeliness and reliability of uploading uplink data by the terminal.

In another embodiment of the present invention, a MAC PDU may include both a random access response for an LAA cell and a random access response for a normal cell.

For example, because the LAA cell and the normal cell may use a same RA-RNTI, a MAC PDU may include both the random access response for the LAA cell and the random access response for the normal cell.

When sending the random access response for the LAA cell and the random access response for the normal cell, the base station may send the random access response for the normal cell before the random access response for the LAA cell. It may be understood that in this embodiment of the present invention, the random access response for the LAA cell may be identified by using a reserved field R of the random access response.

In another embodiment of the present invention, when sending a MAC PDU of uplink data, a terminal device adds the uplink asynchronous HARQ process identifier, so that the base station performs data merging of a corresponding HARQ process based on a received HARQ process identifier and a received MAC PDU. For example, an uplink MAC PDU may be performed after the terminal receives the random access response.

Another embodiment of the present invention is applicable to both intra-base station carrier aggregation and inter-base station carrier aggregation, and random access based on carrier aggregation is applicable to both contention-based random access and non-contention-based random access. The inter-base station carrier aggregation is also referred to as dual connectivity (dual connectivity, DC for short). In this embodiment of the present invention, the intra-base station carrier aggregation may include an LAA cell, and the inter-base station carrier aggregation refers to a normal cell and may also include an LAA cell.

The following describes a configuration structure of a protocol stack of the terminal.

Optionally, the terminal has a terminal protocol stack. In this embodiment, the terminal protocol stack is used to implement data processing of communication with the base station on a terminal side. It should be understood that the terminal protocol stack is only an example for description. The present invention it not limited thereto, and other protocol stacks that can implement communication between the base station and the terminal on the terminal side all fall within the protection scope of the present invention. In addition, communication between the base station and the terminal includes communication between an access network node that can perform the function of the base station and the terminal. For example, the terminal protocol stack that can implement communication between a relay node (Relay Node, RN for short) and the terminal also falls within the protection scope of the present invention.

In an example not for limitative purpose, the terminal protocol stack may include the following protocol layers: a Packet Data Convergence Protocol (Packet Data Convergence Protocol, PDCP for short) layer, a Radio Link Control (Radio Link Control, RLC for short) layer, a Media Access Control (Media Access Control, MAC for short) layer, and a physical (Physical, PHY for short) layer. The PDCP layer is mainly used to compress and decompress/encrypt and decrypt information. The RLC layer is mainly used to perform a function related to an automatic repeat request (Automatic Repeat Request, ARQ for short), and perform information segmentation and cascading or recombine segmented and cascaded information. The MAC layer is mainly used to select a transmission format combination, and implement a function related to scheduling and a hybrid automatic repeat request (Hybrid Automatic Repeat Request, HARQ for short). The PHY layer is mainly used to provide an information transmission service for the MAC layer and a higher layer, and perform encoding modulation processing or demodulation decoding processing based on a selected transmission format combination.

An embodiment of the present invention provides another communication method 800 used for random access. The method may be applicable to both contention-based random access and non-contention-based random access.

As shown in FIG. 8, the method includes the following steps.

801: A MAC layer of a terminal instructs a PHY layer of the terminal to send a random access preamble (preamble).

It may be understood that the MAC layer of the terminal may send at least one of the following information to the PHY layer of the terminal:

a PRACH resource, used to send the random access preamble to the base station;

a RA-RNTI, used by the terminal to receive the random access response sent by the base station;

a random access preamble index (preamble index), used by the PHY layer to generate a preamble sequence based on a preamble root sequence and a preamble index; or preamble transmit power (PREAMBLE_RECEIVED_TARGET_POWER).

It may be understood that the PHY layer of the terminal may obtain a random access preamble based on the foregoing information, and send the random access preamble to the base station.

It may be understood that in random access in an LAA cell, the PHY layer performs LBT. Otherwise, in random access in a normal cell, the PHY layer does not need to perform LBT.

803: The PHY layer of the terminal indicates, to the MAC layer of the terminal, that sending of the random access preamble fails.

It may be understood that the PHY layer of the terminal may indicate implicitly or explicitly, to the MAC layer of the terminal, that sending of the random access preamble fails.

It may be understood that failure of sending the random access preamble by the PHY layer of the terminal has the following possibilities:

for the terminal randomly accessing an LAA cell, LBT contention is unsuccessful, and consequently the random access preamble cannot be sent; or for the terminal randomly accessing an LAA cell and/or a normal cell, the random access preamble cannot be sent because of limited transmit power.

It may be understood that it is alternatively possible that the random access preamble cannot be sent because of another reason.

In the foregoing two cases, the PHY layer of the terminal may indicate, to the MAC layer, that there is no power ramp, so that transmit power of the random access preamble does not correspondingly increase in next preamble transmission. For example, a DC scenario is used as an example. The terminal prepares to randomly access a primary base station and a secondary base station, and the terminal needs to simultaneously send the random access preamble to the primary base station and the secondary base station. However, it is possible that the terminal cannot simultaneously send the random access preamble to the two base stations because of insufficient power. In this case, the terminal may choose to send only one of the random access preambles, and gives up sending the other random access preamble. In an example, the terminal gives up sending the random access preamble to the secondary base station. In this case, when a next random access preamble is sent to the secondary base station, the terminal does not correspondingly increase transmit power of the random access preamble, and sends the random access preamble to a cell of the secondary base station, that is, there is no power ramp.

805: The MAC layer of the terminal omits a random access response sent by a base station.

In this embodiment of the present invention, omitting the random access response may be understood as discarding the random access response or skipping receiving the random access response. Optionally, the terminal may omit, by using the MAC layer, a random access response sent by a base station.

Specifically, omitting the random access response may specifically include the following step:

skipping starting a timer of a random access response window; or skipping monitoring a PDCCH by using a RA-RNTI.

It may be understood that the PDCCH may be in a primary cell of the primary base station and the secondary base station in DC or a primary cell in CA. For example, the primary base station and the secondary base station may both have a primary cell, and all the primary cells may be collectively referred to as primary and secondary cells (SPCell). Skipping monitoring a PDCCH may be considered as skipping monitoring PDCCHs of all the primary cells of the primary base station and the secondary base station or skipping monitoring a PDCCH of any primary cell.

In this embodiment of the present invention, when the random access response is omitted, the MAC layer of the terminal instructs the PHY layer of the terminal to send the random access preamble to the base station again as soon as possible, to improve random access effectiveness and ensure normal communication between the terminal and the base station.

Figure 9:
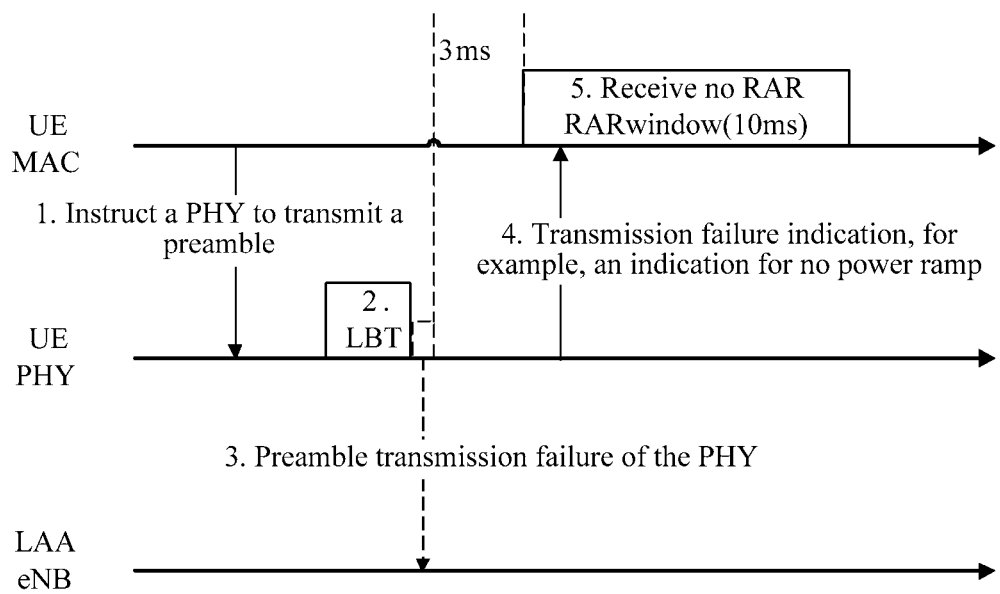
FIG. 9 is another schematic flowchart of a communication method used for random access according to an embodiment of the present invention.

As shown in FIG. 9, for example, duration of a timer of a random access response window is 10 milliseconds (ms). When a terminal does not start the timer, once the terminal obtains, within the duration, a PRACH that may be used to send a random access preamble, the terminal may send the random access preamble to a base station by using the PRACH.

Figure 10:
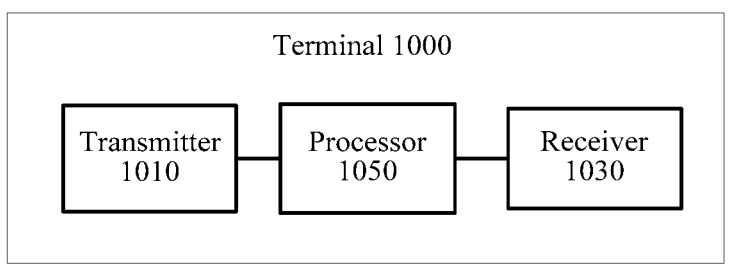
FIG. 10 is a schematic block diagram of a terminal according to an embodiment of the present invention.

FIG. 10 is a schematic block diagram of a terminal 1000 according to an embodiment of the present invention. The terminal 1000 includes:

a transmitter 1010, configured to send random access preamble information to a terminal; and a receiver 1030, configured to receive a random access preamble sent by the terminal, where the transmitter 1010 is further configured to send a random access response to the terminal, the random access response includes an uplink asynchronous hybrid automatic repeat request HARQ process identifier, and the uplink asynchronous HARQ process identifier is used by the terminal to send uplink data to the base station.

Optionally, the random access response further includes listen before talk LBT information, and the LBT information is used by the terminal to obtain an unlicensed-spectrum channel.

Optionally, the base station further includes a processor 1050, configured to: perform, in a licensed assisted access LAA cell of the base station, uplink transmission with the terminal based on the unlicensed-spectrum channel.

Optionally, when carrier aggregation is performed on the LAA cell of the base station and a licensed cell, the terminal performs non-contention-based random access based on the LAA cell, specifically including:

the transmitter 1010 is configured to send a random access preamble sequence to the terminal in any serving cell of the terminal;

the receiver 1030 is configured to receive, in the LAA cell of the base station, the random access preamble sent by the terminal; and the transmitter 1010 is further configured to send, in a primary cell of the base station, the random access response to the terminal.

Optionally, the random access response further includes a physical cell identifier PCI, used to identify whether the random access response is applicable to the terminal.

Optionally, the random access response further indicates that an uplink resource used by the terminal to perform uplink transmission is located on the unlicensed-spectrum channel of the LAA cell.

Optionally, the random access response further includes at least one of the following:

a quantity of scheduled subframes, used to schedule a plurality of subframes at a time to perform the uplink transmission;

a time interval of the LBT;

a subframe offset, used to indicate a subframe interval between uplink grant and the uplink transmission, where the random access response further includes the uplink grant; and a start symbol and an end symbol of the uplink transmission.

Optionally, the random access response further includes the uplink grant, and at least one of the uplink asynchronous HARQ process identifier and the LBT information is located in a field reserved for the uplink grant in the random access response.

Therefore, this embodiment of the present invention avoids a reporting delay caused because the terminal fails in contending for a channel because of an LBT failure in a non-contention-based random access scenario of the LAA cell, and can effectively improve timeliness and reliability of uploading uplink data by the terminal.

It should be understood that the terminal 1000 in this embodiment of the present invention may correspond to the communication method used for non-contention-based random access in the embodiments of the present invention, and the foregoing and other operations and/or functions of the modules of the terminal 1000 are separately to perform corresponding procedures in the methods in FIG. 1 to FIG. 9. For brevity, details are not described herein again.

Figure 11:
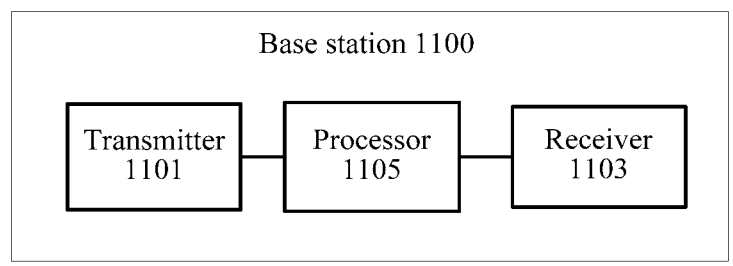
FIG. 11 is a schematic block diagram of a base station according to an embodiment of the present invention.

FIG. 11 is a schematic block diagram of a base station 1100 according to an embodiment of the present invention. The base station 1100 includes:

a transmitter 1101, configured to send random access preamble information to a terminal; and a receiver 1103, configured to receive a random access preamble sent by the terminal, where the transmitter 1101 is further configured to send a random access response to the terminal, the random access response includes an uplink asynchronous hybrid automatic repeat request HARQ process identifier, and the uplink asynchronous HARQ process identifier is used by the terminal to send uplink data to the base station.

Optionally, the random access response further includes listen before talk LBT information, and the LBT information is used by the terminal to obtain an unlicensed-spectrum channel.

Optionally, the base station further includes a processor 1105, configured to: perform, in a licensed assisted access LAA cell of the base station, uplink transmission with the terminal based on the unlicensed-spectrum channel.

Optionally, when carrier aggregation is performed on the LAA cell of the base station and a licensed cell, the terminal performs non-contention-based random access based on the LAA cell, specifically including:

the transmitter 1101 is configured to send a random access preamble sequence to the terminal in any serving cell of the terminal;

the receiver 1103 is configured to receive, in the LAA cell of the base station, the random access preamble sent by the terminal; and the transmitter 1101 is further configured to send, in a primary cell of the base station, the random access response to the terminal.

Optionally, the random access response further includes a physical cell identifier PCI, used to identify whether the random access response is applicable to the terminal.

Optionally, the random access response further indicates that an uplink resource used by the terminal to perform uplink transmission is located on the unlicensed-spectrum channel of the LAA cell.

Optionally, the random access response further includes at least one of the following:

a quantity of scheduled subframes, used to schedule a plurality of subframes at a time to perform the uplink transmission;

a time interval of the LBT;

a subframe offset, used to indicate a subframe interval between uplink grant and the transmission, where the access response further includes the grant; and a start symbol and an end symbol of the transmission.

Optionally, the random access response further includes the uplink grant, and at least one of the uplink asynchronous HARQ process identifier and the LBT information is located in a field reserved for the uplink grant in the random access response.

Therefore, this embodiment of the present invention avoids a reporting delay caused because the terminal fails in contending for a channel because of an LBT failure in a non-contention-based random access scenario of the LAA cell, and can effectively improve timeliness and reliability of uploading uplink data by the terminal.

It should be understood that the base station 1100 in this embodiment of the present invention may correspond to the communication method used for non-contention-based random access in the embodiments of the present invention, and the foregoing and other operations and/or functions of the modules of the base station 1100 are separately to perform corresponding procedures in the methods in FIG. 1 to FIG. 9. For brevity, details are not described herein again.

Figure 12:
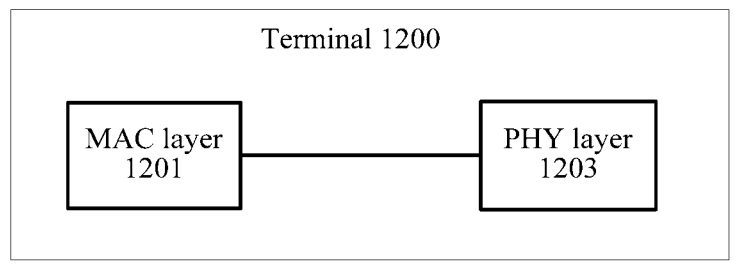
FIG. 12 is another schematic block diagram of user equipment according to an embodiment of the present invention.

FIG. 12 is a schematic block diagram of a terminal 1200 according to an embodiment of the present invention. The terminal 1200 includes:

a MAC layer 1201 of the terminal instructs a PHY layer 1203 of the terminal to send a random access preamble (preamble);

the PHY layer 1203 of the terminal indicates, to the MAC layer 1201 of the terminal, that sending of the random access preamble fails; and the MAC layer 1201 of the terminal omits a random access response sent by a base station.

It may be understood that the MAC layer 1201 of the terminal may send at least one of the following information to the PHY layer of the terminal:

a PRACH resource, used to send the random access preamble to the base station;

a RA-RNTI, used by the terminal to receive the random access response sent by the base station;

a random access preamble index (preamble index), used by the PHY layer to generate a preamble sequence based on a preamble root sequence and a preamble index; or preamble transmit power (PREAMBLE_RECEIVED_TARGET_POWER).

It may be understood that the PHY layer 1203 of the terminal may obtain a random access preamble based on the foregoing information, and send the random access preamble to the base station.

It may be understood that in random access in an LAA cell, the PHY layer 1203 performs LBT. Otherwise, in random access in a normal cell, the PHY layer 1203 does not need to perform LBT.

It may be understood that failure of sending the random access preamble by the PHY layer 1203 of the terminal has the following possibilities:

for the terminal randomly accessing an LAA cell, LBT contention is unsuccessful, and consequently the random access preamble cannot be sent; or for the terminal randomly accessing an LAA cell and/or a normal cell, the random access preamble cannot be sent because of limited transmit power.

It may be understood that it is alternatively possible that the random access preamble cannot be sent because of another reason.

In all the foregoing cases, the PHY layer 1203 of the terminal may indicate, to the MAC layer 1201, that there is no power ramp, so that transmit power of the random access preamble does not correspondingly increase in next preamble transmission. For example, a DC scenario is used as an example. The terminal prepares to randomly access a primary base station and a secondary base station, and the terminal needs to simultaneously send the random access preamble to the primary base station and the secondary base station. However, it is possible that the terminal cannot simultaneously send the random access preamble to the two base stations because of insufficient power. In this case, the terminal chooses to send only one of the random access preambles, and gives up sending the other random access preamble. In an example, the terminal gives up sending the random access preamble to the secondary base station. In this case, when a next random access preamble is sent to the secondary base station, the terminal does not correspondingly increase transmit power of the random access preamble, and sends the random access preamble to a cell of the secondary base station. In other words, there is no power ramp.

In this embodiment of the present invention, omitting the random access response may be understood as discarding the random access response or skipping receiving the random access response.

Specifically, omitting the random access response may specifically include the following step:

skipping starting a timer of a random access response window; or skipping monitoring a PDCCH by using a RA-RNTI.

It may be understood that the PDCCH may be in a primary cell of the primary base station and the secondary base station in DC or a primary cell in CA. For example, the primary base station and the secondary base station may both have a primary cell, and all the primary cells may be collectively referred to as primary and secondary cells (SPCell). Skipping monitoring a PDCCH may be considered as skipping monitoring PDCCHs of all the primary cells of the primary base station and the secondary base station.

In this embodiment of the present invention, when the random access response is omitted, the terminal may send the random access preamble to the base station again as soon as possible, to improve random access effectiveness and ensure normal communication between the terminal and the base station.

The terminal and/or the base station in the apparatus embodiments may further include a memory or a bus system each. The processor, the memory, the receiver, and the transmitter are connected by using the bus system. The memory is configured to store an instruction, and the processor is configured to execute the instruction stored by the memory, to control the receiver to receive a signal and control the transmitter to send a signal.

It should be understood that, the processor in this embodiment of the present invention may be a central processing unit (Central Processing Unit, "CPU" for short), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory may include a read-only memory and a random access memory, and provide an instruction and data to the processor. A part of the memory may further include a non-volatile random access memory. For example, the memory may further store device type information.

The system bus may further include a power bus, a control bus, a status signal bus, and the like, in addition to a data bus. However, for clarity of description, various buses are referred to as the bus system in the embodiments of the present invention.

In an implementation process, each step of the foregoing method may be completed by using an integrated logical circuit of hardware in the processor or an instruction in a form of software. The steps of the methods disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein.

It should further be understood that the first, the second, and various numbers in this specification are used for differentiation only for ease of description, instead of limiting the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character"/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method used for random access, wherein carrier aggregation is performed on a licensed assisted access (LAA) cell and a primary cell of a base station, the method is used by a terminal to perform non-contention-based random access based on the LAA cell, the method comprising:
   receiving, by a terminal, random access preamble information sent by a base station in a serving cell of the terminal, wherein the serving cell comprises the LAA cell and the primary cell;
   sending, in the LAA cell of the base station by the terminal, a first random access preamble to the base station based on the random access preamble information, wherein the first random access preamble is different from a second random access preamble in the primary cell; and
   receiving, by the terminal, a random access response sent by the base station in the primary cell, wherein the random access response comprises an uplink asynchronous hybrid automatic repeat request (HARQ) process identifier, and the uplink asynchronous HARQ process identifier is used by the terminal to send uplink data to the base station.

2. The method according to claim 1, wherein the random access response further comprises listen before talk LBT information, and the LBT information is used by the terminal to obtain an unlicensed-spectrum channel; and
   the method further comprises:
   performing, by the terminal, uplink transmission in the LAA cell of the base station based on the unlicensed-spectrum channel.

3. The method according to claim 2, wherein
   the random access response further indicates that an uplink resource used by the terminal to perform uplink transmission is located on the unlicensed-spectrum channel of the LAA cell.

4. The method according to claim 1, wherein
   the random access response further comprises a physical cell identifier PCI, wherein the physical cell identifier PCI is used by the terminal to identify whether the random access response is applicable to the terminal.

5. A communication method used for random access, wherein carrier aggregation is performed on a licensed assisted access (LAA) cell and a primary cell of a base station, the method is used by a terminal to perform non-contention-based random access based on the LAA cell, the method comprising:
   sending, by a base station, random access preamble information to a terminal in a serving cell of the terminal, wherein the serving cell comprises the LAA cell and the primary cell;
   receiving, by the base station, a first random access preamble sent by the terminal in the LAA cell of the base station, wherein the first random access preamble is different from a second random access preamble in the primary cell; and
   sending, in the primary cell by the base station, a random access response to the terminal, wherein the random access response comprises an uplink asynchronous hybrid automatic repeat request HARQ process identifier, and the uplink asynchronous HARQ process identifier is used by the terminal to send uplink data to the base station.

6. The method according to claim 5, wherein the random access response further comprises listen before talk LBT information, and the LBT information is used by the terminal to obtain an unlicensed-spectrum channel; and
   the method further comprises:
   performing, in the LAA cell of the base station, uplink transmission with the terminal based on the unlicensed-spectrum channel.

7. The method according to claim 6, wherein
   the random access response further indicates that an uplink resource used by the terminal to perform uplink transmission is located on the unlicensed-spectrum channel of the LAA cell.

8. The method according to claim 5, wherein
   the random access response further comprises a physical cell identifier PCI, used to identify whether the random access response is applicable to the terminal.

9. A terminal, wherein carrier aggregation is performed on a licensed assisted access (LAA) cell and a primary cell of a base station, the terminal performs non-contention-based random access based on the LAA cell, the terminal comprising:
   a receiver, configured to receive random access preamble information sent by a base station in a serving cell of the terminal, wherein the serving cell comprises the LAA cell and the primary cell; and
   a transmitter, configured to send in the LAA cell of the base station a first random access preamble to the base station based on the random access preamble information, wherein the first random access preamble is different from a second random access preamble in the primary cell, wherein the receiver is further configured to receive a random access response sent by the base station in the primary cell, the random access response comprises an uplink asynchronous hybrid automatic repeat request HARQ process identifier, and the uplink asynchronous HARQ process identifier is used by the terminal to send uplink data to the base station.

10. The terminal according to claim 9, wherein the random access response further comprises listen before talk LBT information, and the LBT information is used by the terminal to obtain an unlicensed-spectrum channel; and
the terminal further comprises:
a processor, configured to perform uplink transmission in the LAA cell of the base station based on the unlicensed-spectrum channel.

11. The terminal according to claim 10, wherein
the random access response further indicates that an uplink resource used by the terminal to perform uplink transmission is located on the unlicensed-spectrum channel of the LAA cell.

12. The terminal according to claim 9, wherein
the random access response further comprises a physical cell identifier PCI, wherein the physical cell identifier PCI is used by the terminal to identify whether the random access response is applicable to the terminal.

13. A base station, wherein carrier aggregation is performed on a licensed assisted access (LAA) cell and a primary cell of the base station, the base station comprising:
a transmitter, configured to send random access preamble information to a terminal in a serving cell of the terminal, wherein the serving cell comprises the LAA cell and the primary cell; and
a receiver, configured to receive a first random access preamble sent by the terminal in the LAA cell of the base station, wherein the first random access preamble is different from a second random access preamble in the primary cell, wherein
the transmitter is further configured to send in the primary cell a random access response to the terminal, the random access response comprises an uplink asynchronous hybrid automatic repeat request HARQ process identifier, and the uplink asynchronous HARQ process identifier is used by the terminal to send uplink data to the base station.

14. The base station according to claim 13, wherein
the random access response further comprises a physical cell identifier PCI, used to identify whether the random access response is applicable to the terminal.

15. The base station according to claim 13, wherein the random access response further comprises listen before talk LBT information, and the LBT information is used by the terminal to obtain an unlicensed-spectrum channel; and
the base station further comprises:
a processor, configured to perform, in the LAA cell of the base station, uplink transmission with the terminal based on the unlicensed-spectrum channel.

16. The base station according to claim 15, wherein
the random access response further indicates that an uplink resource used by the terminal to perform uplink transmission is located on the unlicensed-spectrum channel of the LAA cell.

* * * * *